Patented May 31, 1932

1,860,753

UNITED STATES PATENT OFFICE

THOMAS ARTHUR SIMMONS, OF HUDDERSFIELD, ENGLAND, ASSIGNOR TO BRITISH DYESTUFFS CORPORATION LIMITED, OF MANCHESTER, ENGLAND

MANUFACTURE OF TRIARYLMETHANE DYES

No Drawing. Application filed December 9, 1927, Serial No. 238,996, and in Great Britain February 5, 1927.

This invention relates to improvements in the manufacture of lissamine green V (color index No. 735—U. S. Patent No. 639,977). The usual method of making this dyestuff includes making an intimate mixture of pure, dry, finely divided tetraethyldiaminobenzhydrol and pure, dry, finely divided sodium salt of 2:7-naphthalenedisulphonic acid in the calculated quantities; this mixture being then digested in a large amount of hot strong sulfuric acid. In the present invention an economy in plant, labor, time and overhead is secured by dispensing with a number of operations necessary in this usual process; namely, isolation of the benzhydrol as a pure dry material, and, similarly, the isolation of dry, pure 2:7-naphthalenedisulphonate. In the present invention, a particular intermediate is prepared as a special preparation; this intermediate being the 2:7-naphthalenedisulphonate of tetraethyldiaminobenzhydrol. In the present process, a crude solution of tetraethyldiaminobenzhydrol is obtained in the usual manner by oxidation of a solution of tetraethyldiaminodiphenylmethane with lead peroxid. To this is added crude sodium 2:7-naphthalenedisulphonate and the mixture acidified. The new salt of the hydrol is completely precipitated under the conditions described below and as it is readily soluble in concentrated sulphuric acid the condensation to the leuco derivative of the dyestuff is conveniently carried out by dissolving the new salt in 100 per cent sulphuric acid and heating the solution. Any isolation and handling of the hydrol or of its omega-sulphonic acid are thus completely avoided, and a further advantage is that the crude naphthalenedisulphonic acid used does not need drying. Still another advantage is that in this new intermediate the two components are present in the correct stochiometrical proportions and a more intimate association is secured than can be obtained in any mechanical mixture.

My invention is illustrated by the following example, in which the parts are parts by weight, but is not limited to the details thereof.

Example. — Tetraethyldiaminodiphenylmethane is converted into the corresponding hydrol by oxidizing with lead peroxide in the usual manner. 31 parts of tetraethyldiaminodiphenylmethane are dissolved in 500 parts of water and 37.5 parts of 100 per cent formic acid and the solution is diluted with crushed ice and water to 700 parts by volume, leaving about 45 parts of unmelted ice. The solution is rapidly agitated and 23 parts of lead peroxide are run in rapidly, being added in the form of a 40 per cent suspension in water. The mixture thus obtained is agitated for about 10 minutes and 36 parts of Glauber's salt added. The mixture is further agitated for about 15 minutes and then the solution filtered to remove lead sulphate and other insolubles. To the filtrate thus obtained, there is added as much sodium 2:7-naphthalenedisulphonate, as corresponds to 28.8 parts of the free acid, and then sufficient sulphuric acid to acidify the whole (usually 5 parts to every 100 parts of mixed liquor). After standing for 8–12 hours separation is complete and the white crystalline hydrol naphthalene disulphonate is filtered off, washed with a little water and dried. The addition product thus obtained may be represented by the probable formula

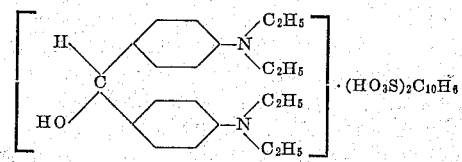

For the condensation the so prepared naphthalene disulphonate of the hydrol is dissolved in 125 parts of 100 per cent sulphuric acid and the solution is heated at 98–100° C. for 27 hours. At the end of this time the mixture is poured into 830 parts of water and after 3–4 hours the leuco dyestuff is filtered off and washed with water.

The leuco compound, when oxidized in the usual manner with lead peroxide gives on salting out with common salt after removal of the lead as sulphate, an excellent yield of colour.

What I claim and desire to secure by Letters Patent is:—

1. As a new intermediate compound capable of conversion into leuco compounds and dyestuffs of the tetralkyldiaminotriarylmethane type, the naphthalene dissulphonate of tetralkyldiaminobenzhydrol having the probable formula

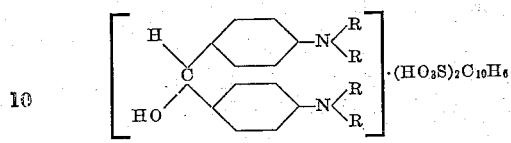

wherein R represents alkyl groups, and being a white or pale colored crystalline substance, the said disulphonate being a salt of the addition type.

2. As a new intermediate compound capable of conversion into leuco compounds and dyestuffs of the tetraethyldiaminotriarylmethane type, the 2:7-napthalene disulphonate of 4:4'-tetraethyldiaminobenzhydrol having the probable formula

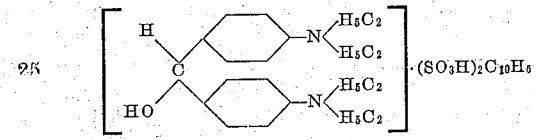

and being a white or pale colored crystalline substance, the said disulphonate being a salt of the addition type.

3. In the manufacture of new intermediate compounds capable of conversion into leuco compounds and dyestuffs of the tetralkyldiaminotriarylmethane type, the process which comprises preparing a solution of tetraethyldiaminobenzhydrol, adding to the said solution the sodium salt of 2:7-napthalene sulphonic acid, acidifying the so prepared solution with sulphuric acid to render the same slightly acid, filtering off the precipitated crystalline 2:7-napthalene disulphonate of tetraethyldiaminobenzhydrol, washing the precipitate with a little water to remove residual impurities and then drying the same.

4. In the manufacture of new intermediate compounds capable of conversion into leuco compounds and dyestuffs of the tetralkyldiaminotriarylmethane type, the process which comprises preparing a solution of a tetralkyldiaminobenzhydrol, adding to the said solution an alkali metal salt of napthalene sulphonic acid, acidifying the so prepared solution with sulphuric acid to render the same slightly acid, filtering off the precipitated crystalline naphthalene disulphonate of tetralkyldiaminobenzhydrol, washing the precipitate with a little water to remove residual impurities and then drying the same.

In testimony whereof I affix my signature.

THOMAS ARTHUR SIMMONS.